US006252174B1

(12) United States Patent
King et al.

(10) Patent No.: US 6,252,174 B1
(45) Date of Patent: Jun. 26, 2001

(54) LEAD WIRE STRAIN RELIEF CONNECTOR AND SWITCH MOUNT

(75) Inventors: John E. King, Florissant; James T. Carpenter, Ferguson, both of MO (US)

(73) Assignee: Emerson Electric Co., St. Louis, MO (US)

(*) Notice: Subject to any disclaimer, the term of this patent is extended or adjusted under 35 U.S.C. 154(b) by 849 days.

(21) Appl. No.: 08/539,858

(22) Filed: Oct. 6, 1995

(51) Int. Cl.[7] .............................. H02G 7/00
(52) U.S. Cl. .............. 174/135; 174/138 G; 200/294
(58) Field of Search .................... 361/807, 809; 200/293, 294, 295; 174/135, 136, 138 G; 24/115 M, 136 R

(56) References Cited

U.S. PATENT DOCUMENTS

| | | | | |
|---|---|---|---|---|
| 1,798,777 | * | 3/1931 | Anderson | 24/136 R |
| 2,673,300 | | 3/1954 | Furnas et al. | 310/71 |
| 2,707,623 | | 5/1955 | Schwaneke | 366/349 |
| 3,391,379 | | 7/1968 | Smotherman | 439/412 |
| 3,502,917 | | 3/1970 | Bizoe | 310/71 |
| 4,135,171 | | 1/1979 | Violet | 366/60 |
| 4,209,661 | * | 6/1980 | Pate et al. | 174/65 R |
| 4,370,579 | | 1/1983 | Kobayashi et al. | 310/50 |
| 4,398,073 | * | 8/1983 | Botz et al. | 200/295 |
| 4,719,379 | | 1/1988 | Daniels et al. | 310/71 |
| 5,329,083 | | 7/1994 | Lai | 200/302.2 |
| 5,411,228 | * | 5/1995 | Morawa et al. | 248/74.5 |

* cited by examiner

*Primary Examiner*—Jeffrey Gaffin
*Assistant Examiner*—Kamand Cuneo
(74) *Attorney, Agent, or Firm*—Howell & Haferkamp, L.C.

(57) ABSTRACT

A lead wire strain relief connector and switch mount is configured to be attached to a surface of an electrical device to secure lead wires of a switch employed in the device, resisting the lead wires from being pulled from the device. The connector and switch mount also includes clasps that securely hold the switch without adhesives or separate fasteners.

29 Claims, 2 Drawing Sheets

LEAD WIRE STRAIN RELIEF CONNECTOR AND SWITCH MOUNT

BACKGROUND OF THE INVENTION (1) Field of the Invention

The present invention pertains to an apparatus that is attached to a surface of an electrical device that secures lead wires of a switch employed in the device, resisting the lead wires from being pulled from the device. The apparatus also includes clasps that securely hold the switch to the apparatus without adhesives or separate fasteners.

(2) Description of the Related Art

Various types of electrical devices, ranging from home appliances to industrial electric motors, employ electric switches that are operative to selectively open and close electric circuits between the devices and their external power sources. Typically, the switch in the electric circuit is mounted stationary on a casing or housing of the device and communicates with the external power source through lead wires that extend from the switch and exit the interior of the device housing through an aperture.

It is common that some sort of strain relief connector be employed in an electrical device to secure lead wires exiting the housing of the device. The strain relief connector is provided to prevent a pulling force exerted on the lead wires from being transmitted to the electrical connections of the lead wires within the device housing and possibly separating the connections. Frequently, an electrical device is provided with a hole in its housing through which the lead wires extend. A resilient grommet is attached around the lead wires and press fit into the housing hole to function as the strain relief connector for the lead wires. An example of this type of strain relief connector is disclosed in the Bizoe U.S. Pat. No. 3,502,917. However, with this type of strain relief connector, the device housing must be manufactured with an aperture that is specifically shaped and sized to receive and securely hold the particular grommet attached around the lead wires and inserted into the aperture. The particular grommet is limited in its use to a device housing manufactured with the particular sized and shaped aperture to receive the grommet.

Frequently, the housings of electrical devices are specifically designed to incorporate a strain relief connector for the lead wires entering the housing. Examples of housings incorporating strain relief connectors are disclosed in the Schwaneke U.S. Pat. No. 2,707,623 and Daniels U.S. Pat. No. 4,719,379. However, as can be appreciated, to specifically design some portion of a device's housing structure to include a strain relief connector for lead wires entering the housing, or to provide a housing surface that mates with a strain relief connector formed on another housing surface such as that shown in Schwaneke, adds to the cost of manufacturing the housing.

It is an object of the present invention to provide a strain relief connector for an electrical device that can be conveniently attached to most any casing or housing surface of the device to securely hold lead wires communicating the device with an external power source and thereby provide a strain relief connection to the lead wires. It is also an object of the present invention to provide a lead wire strain relief connector that is configured to be employed in various different types of electrical devices without requiring the casings or housings of the devices to be modified so that they also contribute to the strain relief functioning of the connector or accommodate the attachment of the connector to the housings, the connector of the invention only requiring a small surface area of a device casing or housing for attachment of the connector. It is a further object of the invention to provide a strain relief connector that may be employed in various different types of electrical devices more inexpensively than prior art connectors due to the elimination of specifically shaped and sized apertures and housing or casing structures required to accommodate or work with prior art strain relief connectors. To further enhance the economy of the lead wire strain relief connector of the invention, it includes an integrally formed mounting for an electrical switch that attaches the switch in a stationary position relative to the device housing without the need for separate fasteners or adhesives or other methods of attachment.

SUMMARY OF THE INVENTION

The lead wire strain relief connector and switch mount of the present invention is basically comprised of a base that supports both a lead wire anchor and a switch mount at fixed positions relative to the electrical device casing or housing to which it is attached. In the preferred embodiment, the base, lead wire anchor and switch mount are all constructed integrally as a single unit. Preferably, they are constructed of a nonconductive plastic material by any conventional molding process. However, the materials and process employed in constructing the apparatus are not critical to its operation, and other materials and manufacturing processes may be employed.

In the preferred embodiment, the base has a columnar configuration with longitudinally opposite top and bottom ends. A center bore extends axially through the base between its ends. The bottom end of the base is shaped with a generally planar surface perpendicular to the base center axis.

The lead wire strain relief anchor is comprised of an arm that cantilevers laterally from a side of the base between the base top and bottom ends. The arm is configured as a narrow, planar web that extends longitudinally downwardly from adjacent the base top end to a bottom edge of the arm adjacent the base bottom end. A beveled edge is formed along the bottom of the arm. The beveled edge is longitudinally spaced a set distance from the bottom end of the base, the set distance being predetermined to crimp switch lead wires between the arm beveled edge and the surface of the casing or housing to which the base is attached.

The switch mount is connected to the base above the arm. The switch mount is comprised of a pair of mutually opposed clamps that project laterally from the base. The clamps have barbs at their distal ends that are spaced a sufficient distance to enable insertion of an electrical switch therebetween. The clamps extend over opposite sides of the switch and their barbs engage around the sides of the switch inserted between the clamps to securely attach the switch to the base without the need for separate fasteners, adhesives or other methods of attachment. The switch mount in the preferred embodiment is also provided with a pair of laterally projecting posts that engage in holes provided in the electrical switch to further secure the switch to the base.

In securing the lead wire strain relief connector and switch mount to the casing of the device with which it is used, a surface of the device casing or housing is chosen which will result in the desired positioning on the device of the switch held by the switch mount. If necessary, the longitudinal length and/or shape of the base may be varied to properly position the switch held in the switch mount. A hole is then made through the device casing surface chosen, and a threaded fastener is then inserted through the center bore of the base and the hole in the casing surface. The lead wires of the switch are positioned between the beveled edge of the arm and the casing surface prior to the fastener being tightened. As the fastener is tightened, the bevel edge crimps the lead wires between the beveled edge and the casing surface, thereby providing a strain relief connection of the lead wires to the device casing. The lead wires are then passed through any convenient opening of the casing to its exterior, or through an aperture provided in the casing for the lead wires. Because the strain relief connector of the invention is not secured in the aperture for the lead wires, it is not necessary to provide the aperture with any specific shape or size.

The lead wire strain relief connector and switch mount of the invention may be employed in most any type of electrical device to inexpensively provide a strain relief connection for the lead wires of the device and a mounting support for an electrical switch that does not require separate fasteners, adhesives or other methods of securing the switch relative to the device.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

The lead wire strain relief connector and switch mount 10 of the present invention provides an economical apparatus that is useful in securing lead wires in an electrical device casing preventing the lead wires from being pulled from their connections within the casing. The economy is provided by the apparatus of the invention being readily adaptable to use on a variety of different types of device casings without requiring modification of the casing, for example by not requiring providing an aperture in the casing specifically shaped or sized to accommodate the apparatus of the invention or providing a surface on the casing that is specifically designed to cooperate with the apparatus in its strain relief function.

Still further, economy is provided by the strain relief connector and switch mount 10 of the present invention by its capability of also supporting a switch, the lead wires of which are secured in the device casing by the connector. By "device casing", what is meant is any rigid support or housing structure of any type of equipment or apparatus with which an electric switch having lead wires is employed. The switch may be a manually operated switch that is accessible from the exterior of the device by its being positioned in an aperture provided in the device casing, or the switch may be an internal switch of the device that is automatically activated on movement of some internal component of the device. In the preferred embodiment of the invention, it is specifically designed for use in this later described operative environment. Therefore, in the description of the preferred embodiment of the lead wire strain relief connector and switch mount 10 to follow, it is described in the operative environment of an electric motor having a rotation speed responsive governor that automatically opens and closes a microswitch. However, it should be kept in mind that the operative environment of the connector and switch mount set forth in the description to follow is only one illustrative environment and that the connector and switch mount 10 of the invention may be employed on a variety of different types of casings, and it is not intended that it be limited to one particular operative environment.

Figure 2:
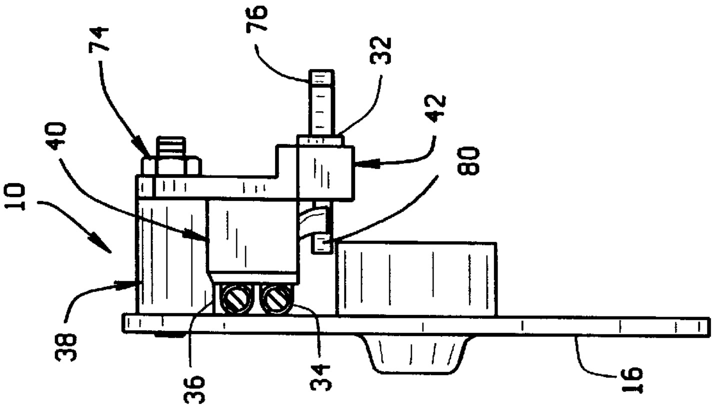
FIG. 2 is a side view of the end plate of the motor shown in FIG. 1, rotated 180°.
Figure 1:
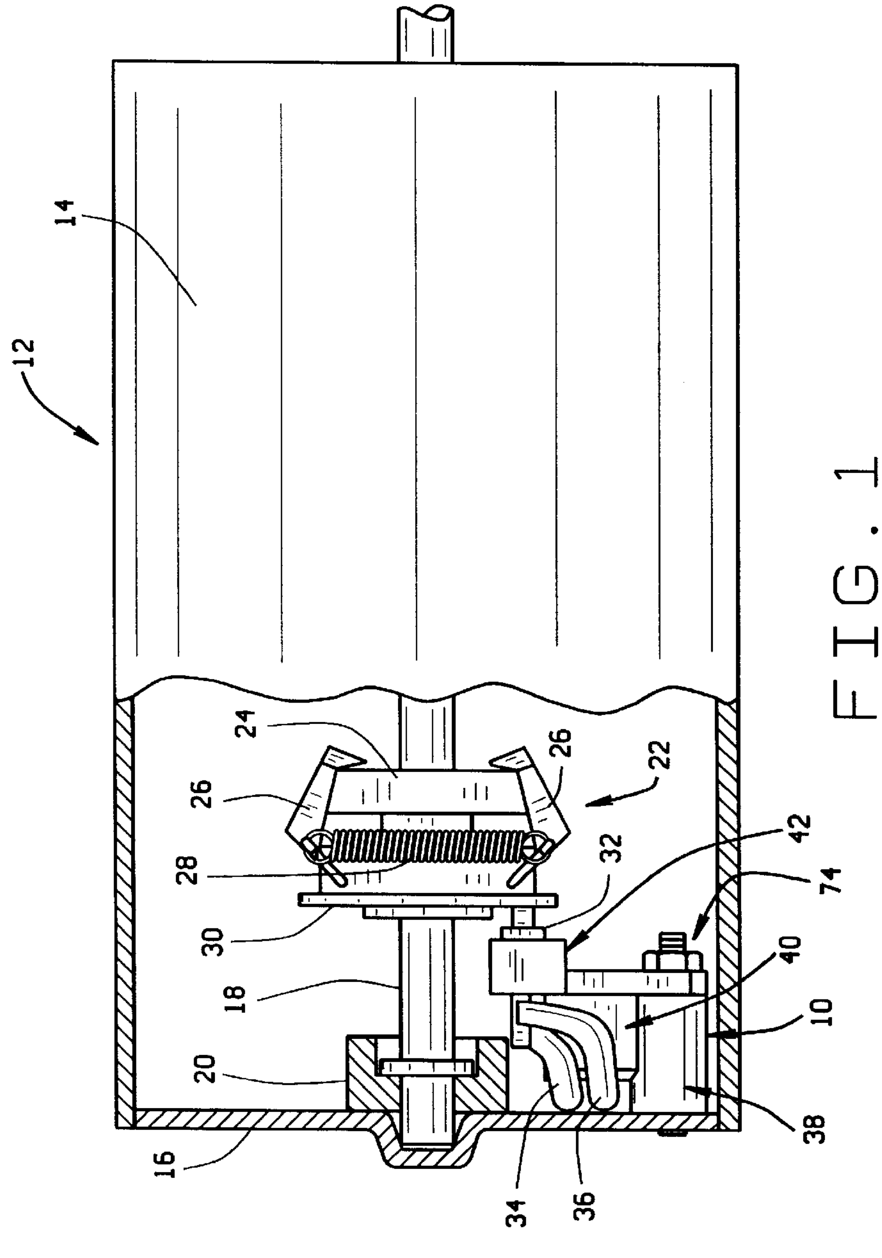
FIG. 1 is a partially cut-away view of an electric motor employing the lead wire strain relief connector and switch mount of the present invention.

FIG. 1 shows an electric motor 12 enclosed within a casing that includes a cylindrical shell portion 14 of the casing and a circular end wall 16 of the casing. A shaft 18 extends through the motor and is shown in FIG. 1 supported for rotation in a journal 20 at its left end. The stator and rotor of the motor are contained in the casing shell portion 14 and are not visible.

Mounted on the shaft adjacent its left hand end is a speed responsive governor assembly 22 which rotates with the shaft. The governor assembly, as well as the rest of the motor construction, does not comprise a part of the invention and will only be described in sufficient detail to understand the functioning of the invention employed with the electric motor. The governor includes a base 24 secured to the shaft 18 and on which are mounted a pair of diametrically opposed centrifugal weights 26. The weights 26 are connected to the base 24 for pivoting movement between a radially extended position away from the shaft and a radially retracted position adjacent the shaft. As shown in FIG. 1, the weights are at their extended positions relative to the shaft. A spring 28 extends between the two weights and pulls them to their retracted positions adjacent the shaft (not shown). At a given speed of rotation of the shaft 18, the centrifugal force exerted on the weights 26 causes them to pivot away from the shaft 18, against the bias of the spring 28, to their extended positions shown in FIG. 1. A reaction plate 30 is mounted on the shaft 18 for axial movement of the plate over the shaft. The reaction plate 30 is connected to the pair of weights 26 for movement of the plate to the left as seen in FIG. 1 in response to the weights pivoting radially away from the shaft 18 to their extended positions, and to move axially to the right as viewed in FIG. 1 in response to the spring 28 returning the weights to their at rest positions adjacent the shaft. With the above described construction, the governor 22 operates to automatically move the reaction plate 30 to the left as viewed in FIG. 1 in response to the motor shaft 18 reaching a minimum speed of revolution. When the speed of the shaft 18 drops below the minimum value, the spring 28 causes the reaction plate 30 to move to the right as viewed in FIG. 1.

The microswitch 32 is used in the electric motor shown in FIG. 1 to close in response to movement of the reaction plate 30 to the left as viewed in FIG. 1, and to open in response to the reaction plate moving to the right. The particular electric motor shown is employed in a gas furnace and powers a blower that exhausts combustion fumes from the gas burner of the furnace. When the blower reaches a certain minimum speed of rotation drawing fumes from the combustion chamber, the reaction plate moves to the left and closes the microswitch 32. The closed microswitch completes a circuit that causes a valve to open, providing gas to the combustion chamber where it is ignited and burned. The fumes from the combusted gas are exhausted from the chamber by the blower powered by the electric motor. The microswitch ensures that the gas valve will not be opened until the speed of the blower reaches a certain minimum speed. If the blower speed were to decrease below this minimum speed, the reaction plate would automatically move to the right causing the microswitch 32 to open. This would break the circuit operating the valve supplying gas to the combustion chamber resulting in the valve closing and interrupting the supply of gas. It can be seen that in order for the microswitch 32 to be operated by the movement of the reaction plate 30, it must be properly positioned in the motor casing relative to the reaction plate 30 in order for it to be operated by the movement of the reaction plate.

The strain relief connector and switch mount 10 of the present invention is used in the operative environment shown in FIG. 1 to hold the microswitch 32 at the desired position proximate to the reaction plate 30, and to secure the lead wires 34, 36 of the microswitch to the casing of the motor. The microswitch shown held by the connector and switch mount 10 is a CHERRY® microswitch produced by The Cherry Corporation. The microswitch 32 can be any known switch of the prior art. The switch shown includes a pivot lever 76 that depresses a switch button 78 when pivoted, and has three switch leads 80. However, the particular switch shown held with the lead wire connector and switch mount 10 is illustrative only for this particular explanation of the use of the connector and switch mount, and the connector and switch mount should not be interpreted as being suited only for use with this particular type and configuration of switch. It should be appreciated by the ordinary skilled artisan that with minor modification, the lead wire connector and switch mount 10 of the present invention can be used to mount a variety of different types of switches in various different types of device casings.

The lead wire anchor and switch mount 10 of the present invention is basically comprised of a base 38, an arm 40, and a switch mount 42. In the preferred embodiment of the invention, the base, arm and switch mount are all integrally formed as a single unit, preferably of a nonconductive plastic material by a conventional molding process. However, it should be understood that the component parts of the lead wire anchor and switch mount 10 may be constructed of different types of materials without departing from the intended scope of the invention.

Referring to FIGS. 3–7, the base 38 is configured as a longitudinally extending column with longitudinally opposite top 44 and bottom 46 ends. The bottom end 46 of the base has a circular, generally planar surface 48. What is meant by "generally planar" is that a majority of the surface is planar, however, the edges of the surface may be cambered to facilitate molding. The exterior surface 50 of the base is cylindrical and extends the longitudinal length of the base between its top and bottom ends. A center bore 52 having a center axis 54 extends longitudinally through the base.

Figure 3:
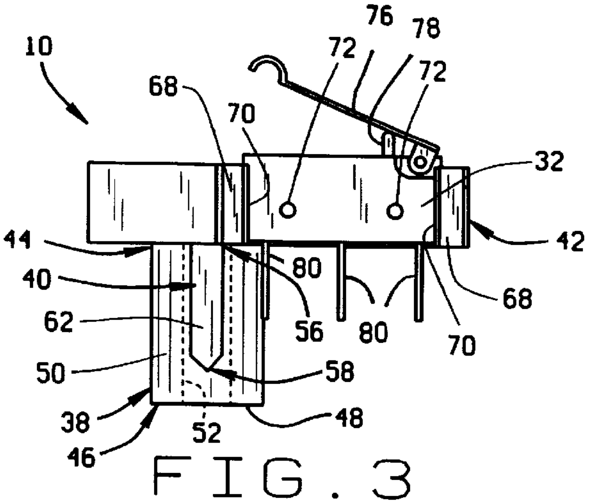
FIG. 3 is a front elevation view of the lead wire strain relief connector and switch mount shown in FIGS. 1 and 2 removed from the motor end plate.
Figure 4:
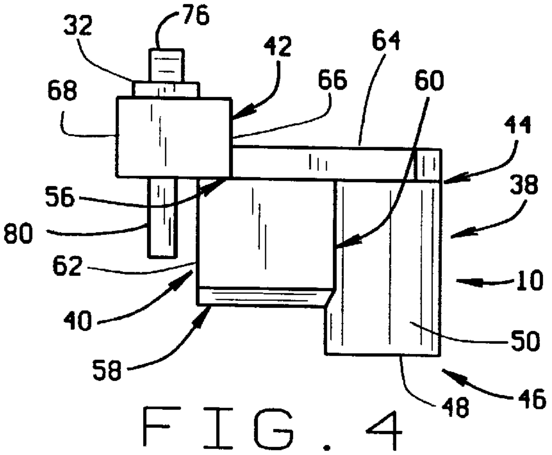
FIG. 4 is a right side view of the lead wire connector and switch mount shown in FIG. 3.
Figure 5:
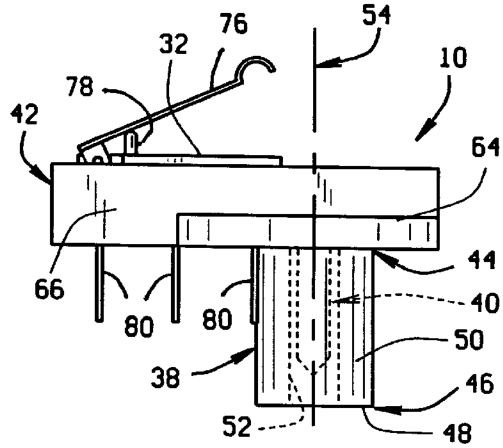
FIG. 5 is a rear elevation view of the lead wire connector and switch mount shown in FIG. 3.
Figure 6:
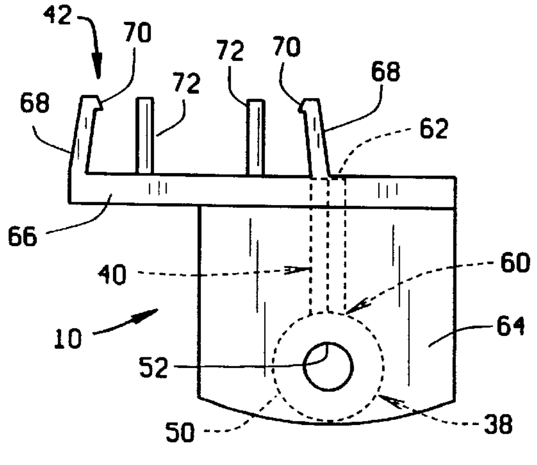
FIG. 6 is a top plan view of the lead wire strain relief connector and switch mount with the switch removed.
Figure 7:
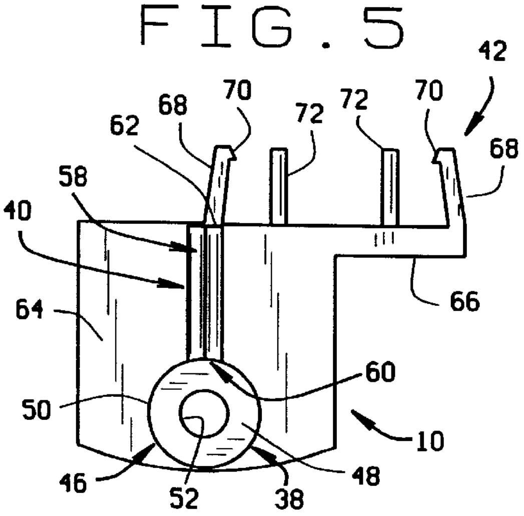
FIG. 7 is a bottom plan view of the connector and switch mount shown in FIG. 6.

The arm 40 projects laterally from one side of the base exterior surface 50. The arm has a general planar configuration parallel to the base bore axis 54. The planar configuration of the arm extends from a top edge 56 of the arm to a bottom edge 58. As best seen in FIGS. 3 and 7, the arm bottom edge has a beveled configuration that extends laterally, perpendicular to the base bore axis 54. The bottom edge 58 is longitudinally spaced a set distance from the bottom end surface 48 of the base. The entire arm 40 cantilevers from the base 38, meaning that it is supported along only one side 60 by the base with its opposite distal side 62 from the base being unsupported. This particular configuration reinforces the arm beveled edge 58 against deflection from its perpendicular orientation relative to the bore center axis 54.

A planar web 64 extends over the top end 44 of the base and the top edge 56 of the arm. The web 64 provides further reinforcement of the connection between the arm 40 and the base 38, resisting deflection of the perpendicular orientation of the arm bottom edge 58 relative to the base bore axis 54.

The switch mount 42 includes a back wall 66 that extends upwardly from the reinforcement web 64. A pair of spaced, mutually opposed resilient clasps 68 project outwardly from the back wall 66 to distal ends of the clasps. Each of the clasps has a barb 70 formed at its distal end. The clasps 68 are positioned a sufficient distance apart from each other to permit insertion of a desired switch between the clasps, in this illustrative embodiment the CHERRY® microswitch 32. For this illustrative embodiment, a pair of posts 72 project from the switch mount back wall 66 between the pair of clasps 68. The posts 72 are provided with this particular embodiment of the connector and switch mount 10 to be received in a pair of holes provided in the CHERRY® microswitch 32. Insertion of the posts 72 through the switch holes further secures the switch stationary relative to the anchor and switch mount 10. If the switch to be used did not have the holes present in the microswitch shown, then the posts would be eliminated from the switch mount.

FIGS. 2–5 show the CHERRY® microswitch 32 held securely by the switch mount 42 of the invention. In use of the invention in the illustrative environment shown in FIGS. 1 and 2, the switch 32, with lead wires 34, 36 attached, is first assembled to the connector and switch mount 10. This is accomplished by merely inserting the switch 32 between the pair of clasps 68 and over the pair of posts 72 on the switch mount back wall 66. As the switch is inserted between the clasps 68, the clasps resiliently flex outwardly away from each other to accommodate the switch. When the switch has been fully inserted between the clasps 68 so that it engages against the switch mount back wall 66, the resiliency of the clasps 68 causes the barbs 70 at their distal ends to engage around opposite corners of the switch 32 as shown in FIG. 3. This resilient engagement of the clasps 68 and their barbs 70 around opposite sides of the switch 32, together with the insertion of the posts 72 through the holes provided in the switch 32, securely holds the switch to the connector and switch mount 10 without the need for separate fasteners, adhesives or other methods of attachment.

With the switch 32 attached to the connector and switch mount 10, the connector and switch mount is next attached to the device casing. In the illustrative environment of FIGS. 1 and 2, the connector and switch mount 10 is attached to the end wall casing portion 16 of the electric motor by a screw and nut fastener 74. Although a screw and nut fastener 74 is shown employed as the fastener of the connector and switch mount 10 to the casing end wall 16, other equivalent methods of attachment may be employed. For example, the base 38 may be formed with a pair of resilient prongs projecting from its bottom end surface 48. The prongs would be specifically configured for engagement in a hole provided for the prongs in the casing end wall 16 to thereby secure the base to the end wall. In the environment shown, before the screw and nut fastener 74 is completely tightened down securing the base 38 to the end wall 16, the switch lead wires 34, 36 are positioned beneath the bottom beveled edge 58 of the arm 40. The screw and nut fastener 74 is then tightened down causing the bottom beveled edge 58 of the arm to move toward the interior surface of the casing end wall 16, crimping the lead wires, 34, 36 between the bottom beveled edge 58 and the surface of the casing end wall 16. In this manner, the lead wire connector and switch mount 10 of the present invention securely holds the lead wires 34, 36 relative to the equipment casing and positions the microswitch 32 in its desired position proximate to the governor reaction plate 30.

It should be appreciated that with minor variations in dimensions of the component parts of the lead wire connector and switch mount 10, it can be adapted for use in a variety of different applications. For example, extending the longitudinal lengths of the base 38 and arm 40 would adapt the lead wire connector and switch mount 10 for use in an electric motor such as that of FIG. 1, where the speed governor was positioned further to the right along the shaft 18. A corresponding decrease in the longitudinal lengths of the base and arm would adapt the lead wire connector and switch mount 10 to be used in a motor like that of FIG. 1, where the speed governor 22 is positioned further to the left of the shaft 18. Still further, it should be appreciated that with other minor modifications to the dimensions of the component parts of the lead wire connector and switch mount 10, and in mounting the lead wire connector and switch mount 10 to different available surfaces of an electrical device, the lead wire connector and switch mount 10 of the invention can be readily adapted for use in a variety of applications other than that shown in FIGS. 1 and 2. While the present invention has been described by reference to a specific embodiment, it should be understood that modifications and variations of the invention may be constructed without departing from the scope of the invention defined in the following claims.

What is claimed is:

1. An apparatus for securing lead wires of an electric switch to a device casing surface to hold the lead wires securely to the device casing surface, the apparatus comprising:

a base separate from the device casing, an arm projecting from the base, and the base having means for attaching the base to the device casing surface with the arm spaced from the device casing surface a set distance, the set distance being sufficiently small to cause the arm to crimp lead wires of a switch positioned between the arm and the device casing surface when the base is attached to the devise casing surface; and at least one clasp connected to and supported by the base, the clasp having means for grasping and holding a switch to the base.

2. The apparatus of claim 1, wherein:

the clasp and the arm are formed as a single integral unit with the base.

3. The apparatus for claim 1 wherein:

the at least one clasp is one of a pair of clasps connected to and supported by the base, the clasps are mutually opposed and spaced from each other distance to enable insertion of a switch between the pair of, and the clasps have means for grasping opposite sides of a switch inserted between the clasps to hold the switch to the base.

4. The apparatus of claim 3, wherein:

the means for clasping alone hold a switch inserted between the clasps to the base.

5. The apparatus of claim 1, wherein:

a pair of posts are connected to and project from the base, the pair of posts are dimensioned to be inserted through a pair of holes in a switch positioned over the post and thereby hold the switch stationary relative to the base.

6. The apparatus of claim 1 wherein:

the base is a column having a longitudinal length and an engagement surface at one end of its length, the engagement surface has means for engaging against and maintaining the base stationary relative to the device casing surface with the longitudinal length of the base projecting outwardly from the device casing surface when the base is attached to the device casing surface; and, the arm has a crimping edge that projects laterally from the base, and at least a portion of the crimping edge is longitudinally spaced the set distance from the engagement surface of the base.

7. The apparatus of claim 6, wherein:

the crimping edge is a beveled edge.

8. An apparatus for securing lead wires of an electric switch to a device casing to hold the lead wires securely to the device casing, the apparatus comprising:

a base separate from the device casing and having a longitudinally extending exterior surface and longitudinally opposite top and bottom end surfaces, the base having means for engaging the bottom end surface with a surface of the device casing for attaching the base to the casing;

an arm cantilevered laterally from the base exterior surface, the arm being spaced longitudinally from the base bottom end surface a set distance, the set distance being sufficiently small to crimp lead wires of a switch positioned between the arm and the device casing surface when the base is attached to the device casing; and at least one clasp is connected to and supported by the base, the clasp has means for grasping a switch and alone holding the switch on the base.

9. The apparatus of claim 8, wherein:

the clasp and the base are formed as a single integral unit.

10. The apparatus of claim 8, wherein:

the at least one clasp is one of a pair of clasps connected to and supported by the base, the clasps are positioned on the base to enable insertion of a switch between the pair of clasps, and the clasps have means for grasping the switch so that the switch is held stationary on the base by the clasps alone.

11. The apparatus of claim 8, wherein:

a pair of posts are connected to and project from the base, the pair of posts are dimensioned to be inserted through a pair of holes in a switch positioned over the posts and thereby hold the switch stationary relative to the base.

12. The apparatus of claim 8, wherein:

the arm has a bottom beveled edge that is longitudinally spaced the set distance from the base bottom end surface.

13. The apparatus of claim 8, wherein:

the base has a center longitudinal axis, the bottom end surface is generally perpendicular to the center axis, and the arm has a bottom edge that extends laterally outwardly from the base exterior surface and perpendicularly relative to the base center axis.

14. An apparatus for securing lead wires of an electric switch to a surface of a device casing to hold the lead wires securely to the surface of the device casing, the apparatus comprising:

a base separate from the device casing, an arm projecting from the base, and the base having a bottom surface that is attachable to the surface of the device casing, the bottom surface is positioned on the base relative to the arm to space the arm from the surface of the device casing a set distance when the bottom surface is attached to the surface of the device casing, the set distance being sufficiently small to crimp lead wires of a switch positioned between the arm and the surface of the device casing when the bottom surface is attached to the surface of the device casing; and at least one clasp for grasping and holding a switch to the base is connected to and supported by the base.

15. The apparatus of claim 14, wherein:

the base is a column having a longitudinal length with the bottom surface at one end of its longitudinal length, the bottom surface engages against and maintains the base stationary relative to the surface of the device casing with the longitudinal length of the base projecting outwardly from the surface of the device casing when the base is attached to the surface of the device casing; and, the arm has a crimping edge that projects laterally from the base, and at least a portion of the crimping edge is longitudinally spaced the set distance from the bottom surface of the base.

16. The apparatus of claim 15, wherein:

the crimping edge is a beveled edge.

17. The apparatus of claim 14, wherein:

the base has a center longitudinal axis with the bottom surface at one end of the base, the bottom surface is generally perpendicular to the center longitudinal axis and engages against and maintains the base stationary relative to the surface of the device casing with the center longitudinal axis of the base projecting outwardly from the surface of the device casing when the base is attached to the surface of the device casing; and, the arm has a beveled edge that projects laterally outwardly from the base center longitudinal axis, and at least a portion of the beveled edge is longitudinally spaced the set distance from the bottom surface of the base.

18. The apparatus of claim 17, wherein:

the arm cantilevers from the base.

19. The apparatus of claim 14, wherein:

the at least one clasp and the arm are formed as a single integral unit with the base.

20. The apparatus of claim 14, wherein:

the at least one clasp is one of a pair of clasps connected to and supported by the base, the clasps are mutually opposed and spaced from each other a sufficient distance to grasp opposite sides of a switch inserted between the clasps and to hold the switch to the base.

21. The apparatus of claim 20, wherein:

the pair of clasps alone hold a switch inserted between the clasps to the base.

22. The apparatus of claim 14, wherein:

a pair of posts are connected to and project from the base.

23. An apparatus for securing lead wires of an electric switch to a device casing to hold the lead wires securely to the device casing, the apparatus comprising:

a base separate from the device casing and having a longitudinally extending exterior surface and longitudinally opposite top and bottom end surfaces, the bottom end surface being attachable to a surface of the device casing for attaching the base to the device casing;

an arm cantilevered laterally from the base exterior surface, the arm being spaced longitudinally from the base bottom end surface a set distance, the set distance being sufficiently small to crimp lead wires of a switch positioned between the arm and the surface of the device casing when the base is attached to the surface of the device casing; and at least one clasp for grasping and holding a switch to the base is connected to and supported by the base.

24. The apparatus of claim 23, wherein:

the arm has a bottom beveled edge that is longitudinally spaced the set distance from the base bottom end surface.

25. The apparatus of claim 23, wherein:

the base has a center longitudinal axis, the bottom end surface is generally perpendicular to the center longitudinal axis, and the arm has a bottom edge that extends laterally outwardly from the base exterior surface and perpendicularly relative to the center longitudinal axis.

26. The apparatus of claim 23, wherein:

the arm has a bottom edge and at least a portion of the bottom edge is spaced the set distance from the surface of the device casing when the base is attached to the surface of the device casing.

27. The apparatus of claim 23, wherein:

the at least one clasp and the base are formed as a single integral unit.

28. The apparatus of claim 23, wherein:

the at least one clasp is one of a pair of clasps connected to and supported by the base, the pair of clasps are positioned on the base to grasp the switch and hold the switch stationary on the base by the clasps alone.

29. The apparatus of claim 23, wherein:

a pair of posts are connected to and project from the base in positions to be inserted through a pair of holes in a switch positioned over the posts and thereby hold the switch stationary relative to the base.

* * * * *